United States Patent
Song et al.

(10) Patent No.: US 11,606,032 B2
(45) Date of Patent: Mar. 14, 2023

(54) ADAPTIVE COMBINATION POWER SUPPLY CIRCUIT AND CHARGING ARCHITECTURE

(71) Applicant: QUALCOMM Incorporated, San Diego, CA (US)

(72) Inventors: Chunping Song, Palo Alto, CA (US); Jiwei Chen, Fremont, CA (US); David King Wai Li, Santa Clara, CA (US)

(73) Assignee: QUALCOMM incorporated, San Diego, CA (US)

( * ) Notice: Subject to any disclaimer, the term of this patent is extended or adjusted under 35 U.S.C. 154(b) by 446 days.

(21) Appl. No.: 16/683,913

(22) Filed: Nov. 14, 2019

(65) Prior Publication Data
US 2020/0161976 A1     May 21, 2020

Related U.S. Application Data

(60) Provisional application No. 62/767,623, filed on Nov. 15, 2018.

(51) Int. Cl.
| | | |
|---|---|---|
| *H02J 7/00* | (2006.01) | |
| *H02M 3/158* | (2006.01) | |
| *H02J 7/34* | (2006.01) | |

(52) U.S. Cl.
CPC ............ *H02M 3/1582* (2013.01); *H02J 7/00* (2013.01); *H02J 7/0072* (2013.01); *H02J 7/34* (2013.01)

(58) Field of Classification Search
CPC ....................................................... H02J 7/00
See application file for complete search history.

(56) References Cited

U.S. PATENT DOCUMENTS

| | | | |
|---|---|---|---|
| 9,590,436 B2 | 3/2017 | Sporck et al. | |
| 2016/0190921 A1 | 6/2016 | Kumar et al. | |
| 2018/0026467 A1* | 1/2018 | Shin ...................... | H02J 7/0029 |
| | | | 320/107 |
| 2018/0115157 A1* | 4/2018 | Chan ........................ | H02J 7/00 |

FOREIGN PATENT DOCUMENTS

EP         3312968 A1     4/2018

OTHER PUBLICATIONS

International Search Report and Written Opinion—PCT/US2019/061665—ISA/EPO—dated Mar. 6, 2020.

\* cited by examiner

*Primary Examiner* — Robert Grant
(74) *Attorney, Agent, or Firm* — Patterson & Sheridan, LLP

(57) ABSTRACT

Certain aspects of the present disclosure generally relate to an adaptive combination power supply circuit. The adaptive combination power supply circuit may be capable of switching between performing as a three-level buck converter and as a divide-by-two charge pump. One example power supply circuit generally includes a first transistor; a second transistor coupled to the first transistor via a first node; a third transistor coupled to the second transistor via a second node; a fourth transistor coupled to the third transistor via a third node; a capacitive element having a first terminal coupled to the first node and a second terminal coupled to the third node; an inductive element having a first terminal coupled to the second node; and a switch having a first terminal coupled to the first terminal of the inductive element, the switch having a second terminal coupled to a second terminal of the inductive element.

9 Claims, 8 Drawing Sheets

ADAPTIVE COMBINATION POWER SUPPLY CIRCUIT AND CHARGING ARCHITECTURE

CROSS-REFERENCE TO RELATED APPLICATION

This application claims benefit of U.S. Provisional Patent Application Ser. No. 62/767,623, entitled "Adaptive Combination Power Supply Circuit and Charging Architecture" and filed Nov. 15, 2018, which is herein incorporated by reference in its entirety.

TECHNICAL FIELD

Certain aspects of the present disclosure generally relate to electronic circuits and, more particularly, to an adaptive combination power supply circuit.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

Power management integrated circuits (power management ICs or PMICs) are used for managing the power requirement of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion, battery charging, power-source selection, voltage scaling, power sequencing, etc.

SUMMARY

Certain aspects of the present disclosure generally relate to an adaptive combination power supply circuit and methods for operation of such a power supply circuit.

Certain aspects of the present disclosure provide a power supply circuit. The power supply circuit generally includes a first transistor; a second transistor coupled to the first transistor via a first node; a third transistor coupled to the second transistor via a second node; a fourth transistor coupled to the third transistor via a third node; a capacitive element having a first terminal coupled to the first node and a second terminal coupled to the third node; an inductive element having a first terminal coupled to the second node; and a switch having a first terminal coupled to the first terminal of the inductive element, the switch having a second terminal coupled to a second terminal of the inductive element.

Certain aspects of the present disclosure provide a power management integrated circuit (PMIC) comprising at least a portion of the power supply circuit described above.

Certain aspects of the present disclosure provide a battery charging circuit comprising the power supply circuit described above.

Certain aspects of the present disclosure provide a battery charging circuit. The battery charging circuit generally includes a master charging circuit and at least one slave charging circuit having an output coupled in parallel with an output of the master charging circuit. At least one of the master charging circuit or the slave charging circuit comprises the power supply circuit described above.

Certain aspects of the present disclosure provide a method of regulating power. The method generally includes operating a power supply circuit in a first operation mode, the power supply circuit including an inductive element and a switch coupled in parallel with the inductive element, wherein the switch is open in the first operation mode; and closing the switch to operate the power supply circuit in a second operation mode. The first operation mode may be a three-level buck converter mode. In this case, the second operation mode may be a divide-by-two charge pump mode.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like reference numbers and designations in the various drawings indicate like elements.

DETAILED DESCRIPTION

Figure 1:
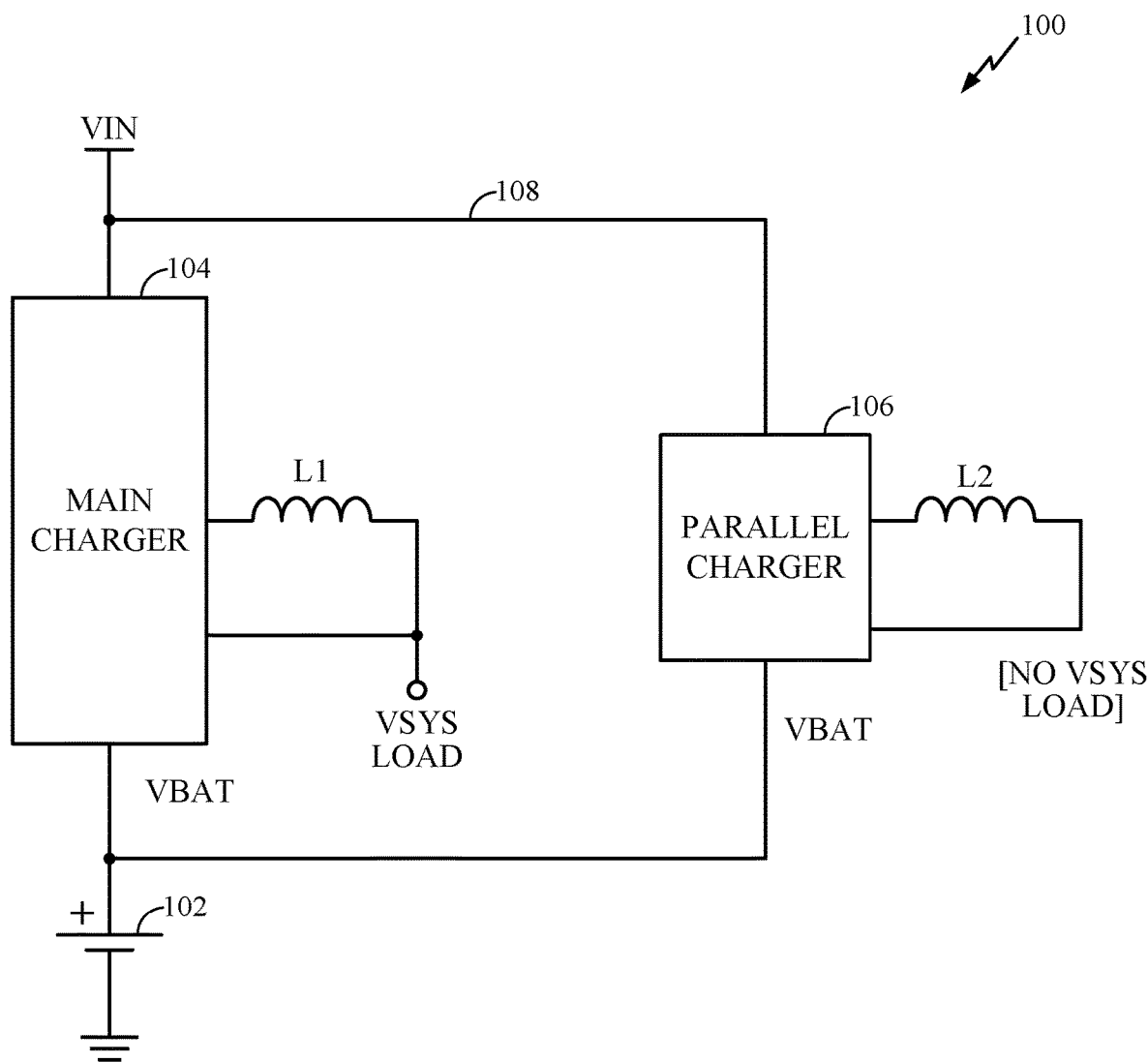
FIG. 1 is a block diagram of an example master-slave charging circuit for charging a battery, where the master-slave charging circuit includes two parallel charging circuits.

Certain aspects of the present disclosure provide an adaptive combination power supply circuit. The adaptive combination power supply circuit may be capable of switching between performing as a three-level buck converter and as a divide-by-two charge pump.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Example Battery Charging Architecture

In order to charge the battery in a portable device (e.g., a smartphone, tablet, and the like), a battery charging circuit may be utilized. For certain aspects, the battery charging circuit, or at least a portion thereof, may reside in a power management integrated circuit (PMIC) in the device. The battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Example master-slave battery charging circuits are described in U.S. Pat. No. 9,590,436 to Sporck et al., filed Apr. 11, 2014 and entitled "Master-Slave Multi-Phase Charging."

FIG. 1 is a block diagram of an example master-slave charging circuit 100 for charging a battery 102. The master-slave charging circuit 100 includes two parallel charging circuits: a main charger 104 (also referred to as a master charger) and a parallel charger 106 (also referred to as a slave charger). The main charger 104 and the parallel charger 106 may receive power from the same power supply voltage rail 108 (e.g., with input voltage VIN as illustrated in FIG. 1) or from different power sources (e.g., different power supply rails). The main charger 104 and the parallel charger 106 may use the same or different power supply circuit topologies. For example, the main charger 104 may employ a switched-mode power supply (SMPS) topology (e.g., a buck converter topology), while the parallel charger 106 is implemented with a charge pump topology or the same SMPS topology. With buck converters, for example, the main charger 104 and the parallel charger 106 may include or be connected to an inductor L1 and an inductor L2, respectively, in an effort to maintain continuous current out of the chargers and into respective loads. The main charger 104 may control the parallel charger 106, but both chargers in the master-slave charging circuit 100 are utilized to charge the battery 102 from respective output voltages, coupled to a battery voltage node (VBAT). As illustrated in FIG. 1 for certain aspects, while the main charger 104 may also be used to provide power to other loads within the device (referred to as the system load voltage, or VSYS LOAD), the parallel charger 106 may be used solely to charge the battery 102.

Example Adaptive Combination Charging Architecture

Battery charging systems are trending towards higher charging current, which leads to the desire for higher efficiency converters that can operate over a wider battery voltage range. To reduce thermal issues and/or conserve power, it may be desirable to operate such battery charging systems with higher efficiency.

In one example parallel charging solution, the master charger is implemented based on a buck converter topology. The master charger is capable of charging the battery and providing power by itself or may be paralleled with one or more slave chargers. Each of the slave chargers may be implemented as a switched-capacitor converter (e.g., a divide-by-two (Div2) charge pump) or a switched-mode power supply (SMPS) topology using an inductor (e.g., a buck converter). Charge pump converters may provide a more efficient alternative to buck converters.

With conventional inductor-based two-level buck converters, it may be challenging to use a smaller inductance L. A lower switching frequency (Fsw) may be utilized in an effort to lower switching loss. However, lower Fsw may cause higher voltage ripple with lower inductance L, which leads to more inductor loss. A smaller inductance may also create a thermal hot spot. It may also be difficult to further enhance efficiency with conventional two-level buck converters. The loss, especially the switching loss, will be even higher under higher input voltage (Vin). Furthermore, it may be hard to further increase power density due to limitations of power loss, inductor size, etc.

Conventional Div2 charge pumps also pose several design challenges. For example, a Div2 charge pump may operate efficiently under constant current (CC) mode, but may not work efficiently under constant voltage (CV) mode. Consequently, in some applications such as battery chargers, another power supply topology (e.g., an inductor-based SMPS) may be implemented in conjunction with the charge pump. Furthermore, a Div2 charge pump may not support higher power or higher charging current with certain adaptor cables (e.g., 3 A cables).

Consequently, for conventional parallel charging solutions, customers may have to select between different parallel charging product configurations based on desired charge current, cost, cable, and adaptor support. These different product configurations may have different connection configurations (e.g., MID to VIN Slave), which may implicate different software for support. These constraints provide less flexibility for product placement.

Accordingly, certain aspects of the present disclosure provide a charger architecture for further enhancing charging efficiency, especially under heavy load. Referred to herein as an "adaptive combination power supply circuit," this charger architecture further increases power density to reduce the solution size and use a smaller inductor, balances power loss, avoids a thermal hot spot, supports a higher power specification with existing adaptor cables (e.g., 3 A cables), and/or operates in the highest efficiency range in different scenarios.

Figure 2:
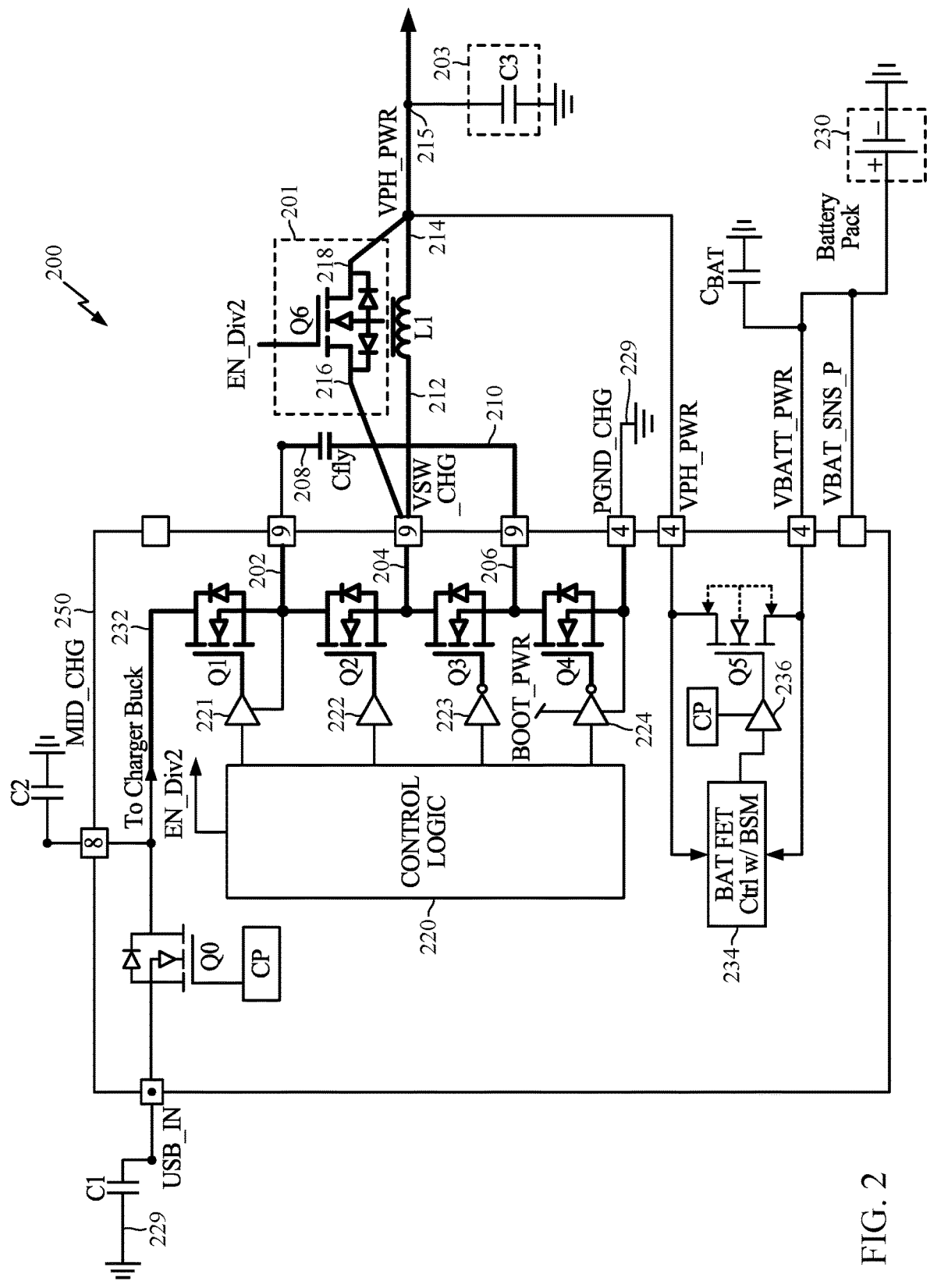
FIG. 2 is a block diagram of an example adaptive combination power supply circuit implemented in a master charging circuit, in accordance with certain aspects of the present disclosure.

FIG. 2 is a block diagram of an example adaptive combination power supply circuit 200 implemented as a master charging circuit, in accordance with certain aspects of the present disclosure. The adaptive combination power supply circuit 200 may be realized by adding a switch 201 across an inductive element L1 of a three-level buck converter topology. The three-level buck converter topology may include a first transistor Q1, a second transistor Q2, a third transistor Q3, a fourth transistor Q4, a flying capacitive element Cfly, the inductive element L1, and a load 203, which is represented here by capacitive element C3.

Transistor Q2 may be coupled to transistor Q1 via a first node 202, transistor Q3 may be coupled to transistor Q2 via a second node 204, and transistor Q4 may be coupled to transistor Q3 via a third node 206. For certain aspects, the transistors Q1-Q4 may be implemented as n-type metal-oxide-semiconductor (NMOS) transistors, as illustrated in FIG. 2. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node 229 (e.g., electric ground, labeled "PGND_CHG") for the circuit. The flying capacitive element Cfly may have a first terminal 208 coupled to the first node 202 and a second terminal 210 coupled to the third node 206. The inductive element L1 may have a first terminal 212 coupled to the second node 204 (also referred to as the "switching node") and a second terminal 214 coupled to the output voltage node 215 (labeled "VPH_PWR") and the load 203.

The switch 201 may be coupled in parallel with the inductive element L1, having a first terminal 216 coupled to the first terminal 212 of the inductive element L1 and a second terminal 218 coupled to the second terminal 214 of the inductive element L1. For certain aspects, the switch 201 may be implemented by a transistor, such as transistor Q6, which may be an NMOS transistor. In this case, the source of transistor Q6 may be coupled to the first terminal 212 of the inductive element L1, and the drain of transistor Q6 may be coupled to the second terminal 214 of the inductive element L1.

Control logic 220 may control operation of the adaptive combination power supply circuit 200. For example, the control logic 220 may control operation of transistors Q1-Q4 via output signals to the inputs of respective gate drivers 221-224. The outputs of the gate drivers 221-224 are coupled to respective gates of transistors Q1-Q4. During operation of the adaptive combination power supply circuit 200, the control logic 220 may cycle through four different phases. In a first phase, transistors Q1 and Q3 are activated, and transistors Q2 and Q4 are deactivated, to charge the flying capacitive element Cfly and to energize the inductive element L1. In a second phase, transistor is Q1 is deactivated, and transistor Q4 is activated, such that the switching node (second node 204) is coupled to the reference potential node (e.g., PGND_CHG), the flying capacitive element Cfly is disconnected, and the inductive element L1 is deenergized. In a third phase, transistors Q2 and Q4 are activated, and transistor Q3 is deactivated, to discharge the flying capacitive element Cfly and to energize the inductive element L1. In a fourth phase, transistor Q3 is activated, and transistor Q2 is deactivated, such that the flying capacitive element Cfly is disconnected and the inductive element L1 is deenergized.

Furthermore, the control logic 220 has an output signal labeled "EN_Div2" configured to control operation of the switch 201 and selectively enable divide-by-two charge pump operation. For certain aspects, when the EN_Div2 signal is logic low, the switch 201 is open, and the adaptive combination power supply circuit 200 operates as a three-level buck converter using the inductive element L1. When the EN_Div2 signal is logic high, the switch 201 is closed, thereby shorting across the inductive element L1 and effectively removing the inductive element L1 from the circuit, such that the power supply circuit 200 operates as a divide-by-two charge pump. The control logic 220 may be configured to automatically control operation of the switch 201 (e.g., through the logic level of the EN_Div2 signal) based on at least one of an input voltage (e.g., USB_IN from a Universal Serial Bus (USB) power source) or an operation mode, for the power supply circuit 200.

Figure 3B:
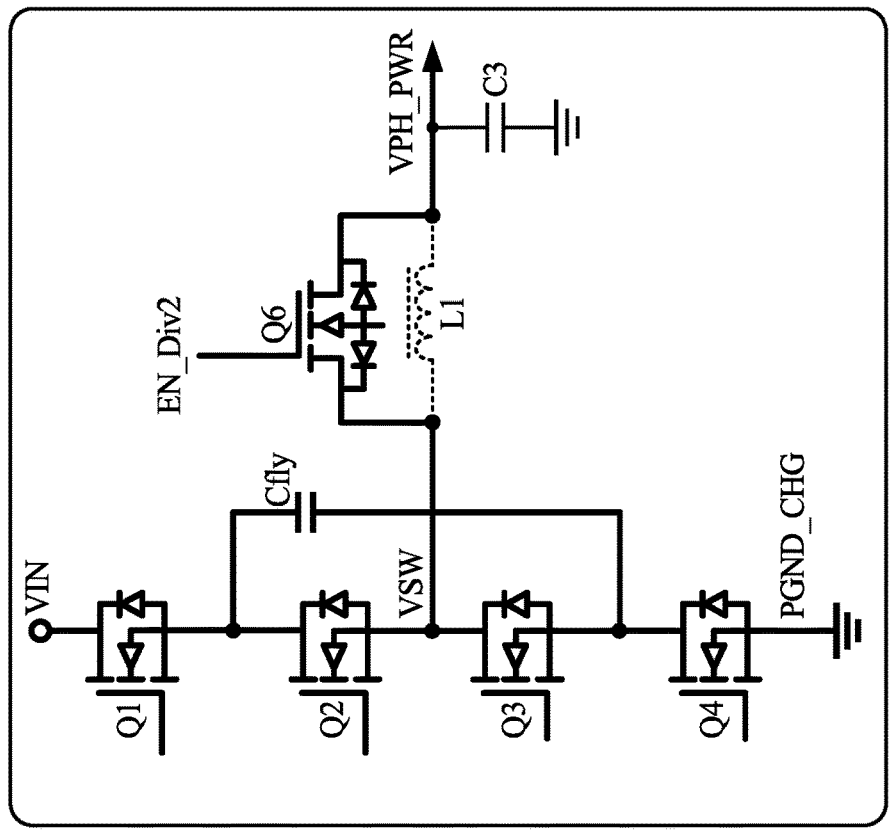
FIG. 3B is an equivalent circuit diagram of the example adaptive combination power supply circuit in FIG. 2 when the transistor across the inductor is activated, in accordance with certain aspects of the present disclosure.
Figure 3A:
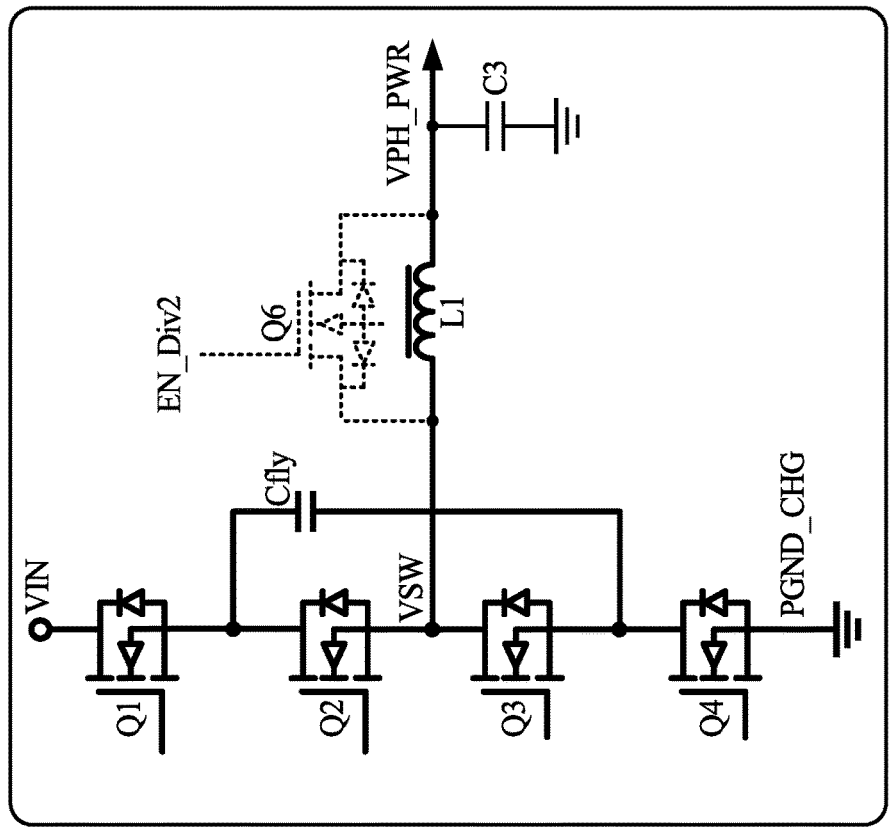
FIG. 3A is an equivalent circuit diagram of the example adaptive combination power supply circuit in FIG. 2 when a transistor across an inductor is deactivated, in accordance with certain aspects of the present disclosure.

FIG. 3A is an equivalent circuit diagram of the example adaptive combination power supply circuit 200 in FIG. 2 when transistor Q6 across the inductive element L1 is deactivated. FIG. 3B is an equivalent circuit diagram of the example adaptive combination power supply circuit 200 in FIG. 2 when transistor Q6 across the inductive element L1 is activated.

Returning to FIG. 2, the adaptive combination power supply circuit 200 may also include a capacitive element C1, a reverse current blocking transistor Q0, a capacitive element C2, a transistor Q5, a battery 230, and a battery capacitive element $C_{BAT}$. The reverse current blocking transistor Q0 (which may be referred to as a front-porch field-effect transistor (FPFET)) may be coupled between the input voltage node (USB_IN) and the drain of transistor Q1 at node 232 (labeled "MID_CHG"). The capacitive element C1 may be coupled in shunt between the input voltage node USB_IN and the reference potential node 229, and the capacitive element C2 may be coupled in shunt between node 232 and the reference potential node 229. The reverse current blocking transistor Q0 may be implemented as an NMOS transistor, where the source of transistor Q0 is coupled to the input voltage node USB_IN and the drain of transistor Q0 coupled to node 232. Transistor Q5 may be referred to as a battery field-effect transistor (BATFET)), which may be implemented by an NMOS transistor as depicted. The drain of transistor Q5 may be coupled to the output voltage node 215 (VPH_PWR), and the source of transistor Q5 may be coupled to a terminal of the battery (labeled "VBATT_PWR"). The gate of transistor Q5 may be controlled by battery logic 234 and a gate driver 236 as shown. The battery capacitive element $C_{BAT}$ may be coupled in shunt across the terminals of the battery 230 (VBATT_PWR and the reference potential node 229).

For certain aspects, at least a portion of the adaptive combination power supply circuit 200 may be implemented in an integrated circuit 250. For example, as illustrated in FIG. 2, at least transistors Q0-Q5, control logic 220, gate drivers 221-224, battery logic 234, and gate driver 236 may be included in the integrated circuit 250. The capacitive elements C1, C2, C3, and $C_{BAT}$, the inductive element L1, and the battery 230 may be implemented outside of the integrated circuit 250. Although illustrated in FIG. 2 as being outside of the integrated circuit 250, the switch 201 may be fabricated as part of the integrated circuit 250 for certain aspects.

As described above, the adaptive combination power supply circuit may be capable of switching between performing as a three-level buck converter and as a divide-by-two charge pump, by opening or closing a switch connected in parallel with the inductor. The transition may be adaptive depending on adaptor type, cable type, charging status, protection capability (e.g., current limit), etc. With respect to charging status, the adaptive combination power supply circuit may operate as a 3-level buck converter during trickle and precharging modes, operate as a Div2 charge pump during CC mode, and back to operating as a 3-level buck converter in CV mode to finish charging. The adaptive combination power supply circuit achieves the benefits of both a 3-level buck converter and a Div2 charge pump. Its flexible architecture offers different configuration options for different customer specifications. Namely, the adaptive combination power supply circuit may be configured as a 3-level buck converter, as a Div2 charge pump, or as an adaptive combination converter capable of automatically transitioning between operating as either a 3-level buck converter or a Div2 charge pump depending on operating conditions. Thus, the adaptive combination power supply circuit can support different adaptors at the highest efficiency and can support high power delivery with high efficiency.

During a precharging condition, transistor Q6 may be deactivated (the switch 201 is open), and the master charger may be operated as a 3-level buck converter to regulate the output voltage VPH_PWR at the minimum system voltage (VSYS_min) and to support the load. During CC mode, once the input voltage (e.g., USB_IN) and VPH_PWR are in the Div2 window, Q6 may be activated (the switch 201 is closed) to short the inductor, and the master charger operates in Div2 charge pump mode, incrementing or decrementing the input voltage to regulate the charging current. Once CV mode is entered, transistor Q6 is deactivated, and the master charger may return to operating as a 3-level buck converter. Similarly, if a current-rated cable is used (e.g., cable rated for 3 A) and charging current under Div2 operation leads to an input current greater than the current rating (e.g., >3 A), transistor Q6 may be deactivated (the switch is opened), and the circuit operates as a 3-level buck converter to support higher power with high efficiency.

Figure 4:
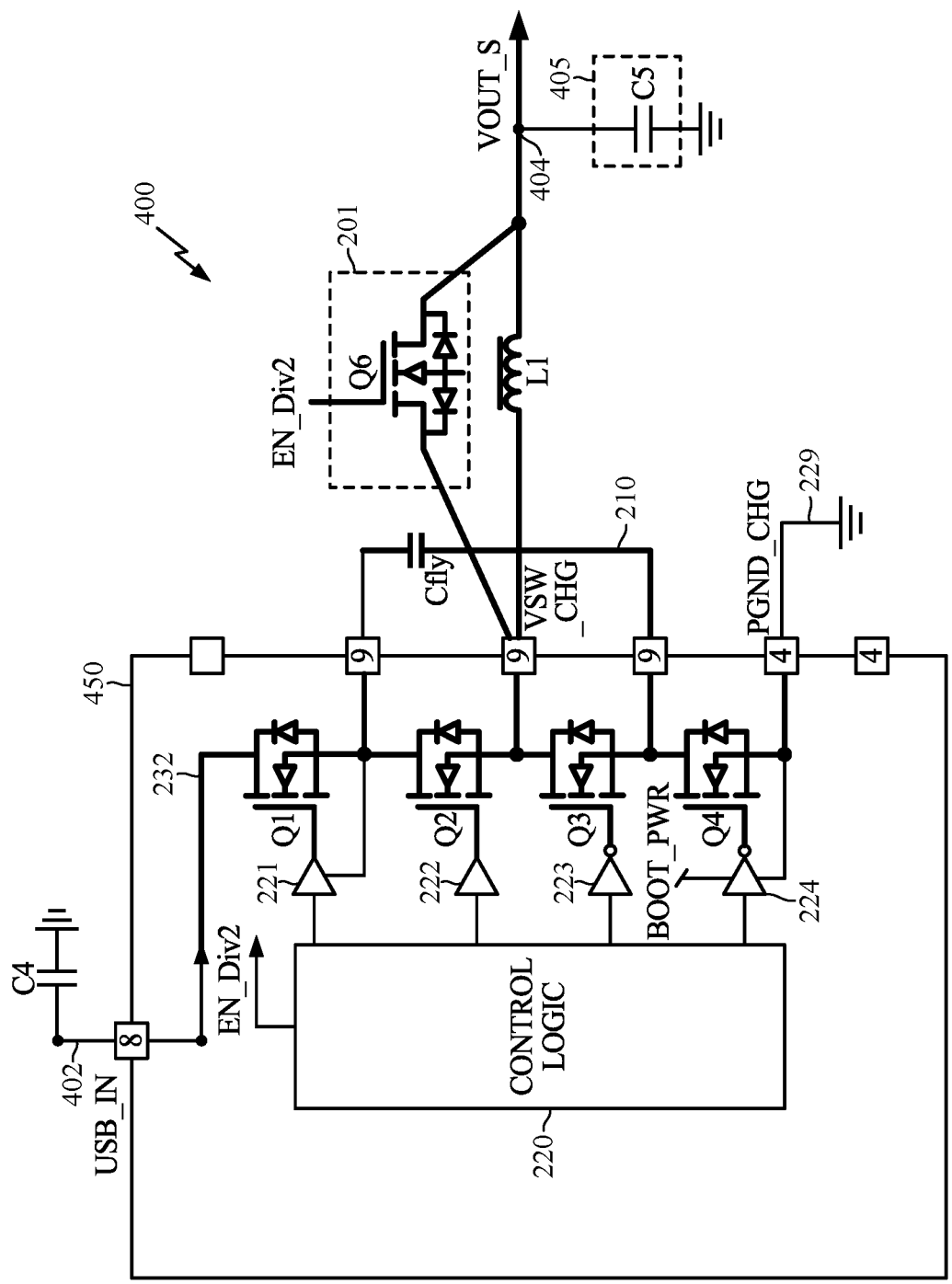
FIG. 4 is a block diagram of an example adaptive combination power supply circuit implemented in a slave charging circuit, in accordance with certain aspects of the present disclosure.

The architecture of the adaptive combination power supply circuit may be adapted for either master or slave chargers. FIG. 4 is a block diagram of an example adaptive combination power supply circuit 400 implemented as a slave charging circuit, in accordance with certain aspects of the present disclosure. In addition to the components described above for FIG. 2, the adaptive combination power supply circuit 400 of FIG. 4 includes capacitive elements C4 and C5. The input voltage node 402 for the adaptive combination power supply circuit 400 may be coupled to node 232 and may receive a USB_IN voltage as illustrated. The output voltage node 404 (labeled "VOUT_S" for slave output voltage) may be coupled to a load 405, which is represented here by shunt capacitive element C5.

For certain aspects, at least a portion of the adaptive combination power supply circuit 400 may be implemented in an integrated circuit 450. For example, as illustrated in FIG. 4, at least transistors Q0-Q5, control logic 220, and gate drivers 221-224 may be included in the integrated circuit 450. The capacitive elements C4 and C5 and the inductive element L1 may be implemented outside of the integrated circuit 450. Although illustrated in FIG. 4 as being outside of the integrated circuit 450, the switch 201 may be fabricated as part of the integrated circuit 450 for certain aspects.

The architecture illustrated in FIG. 4 may be operated in 3-level buck converter mode, operated in a Div2 charge pump mode, or may be automatically transitioned between the 3-level buck converter and Div2 charge pump modes, depending on operation conditions. Although not illustrated in FIG. 4, a reverse current blocking transistor (which may be referred to as a front-porch field-effect transistor (FPFET)) may be added between the drain of transistor Q1 and the input voltage node 402 (USB_IN), and/or a transistor (e.g., a battery field-effect transistor (BATFET)) may be added between VOUT_S and the load (e.g., a battery), similar to the power supply circuit 200 of FIG. 2.

During a precharging condition, the slave charger may be turned off (e.g., if the slave charger does not support the VPH_PWR load, typically supplied by the master charger). During CC mode, the slave charger may be turned on and may operate as a three-level buck converter or a Div2 charge pump. Under certain conditions (e.g., a particular Vin and Vout window), transistor Q6 may be activated (the switch is closed), and Div2 charge pump operation is selected for higher efficiency. If a cable is used for charging and the charging current under Div2 operation leads to an input current greater than a current rating of the cable (e.g., >3 A), transistor Q6 may be deactivated (the switch is opened), and the circuit may operate as a 3-level buck converter to support higher power with high efficiency. Once CV mode is entered, the slave charger may be turned off, and the master charger may be used by itself.

Figure 5A:
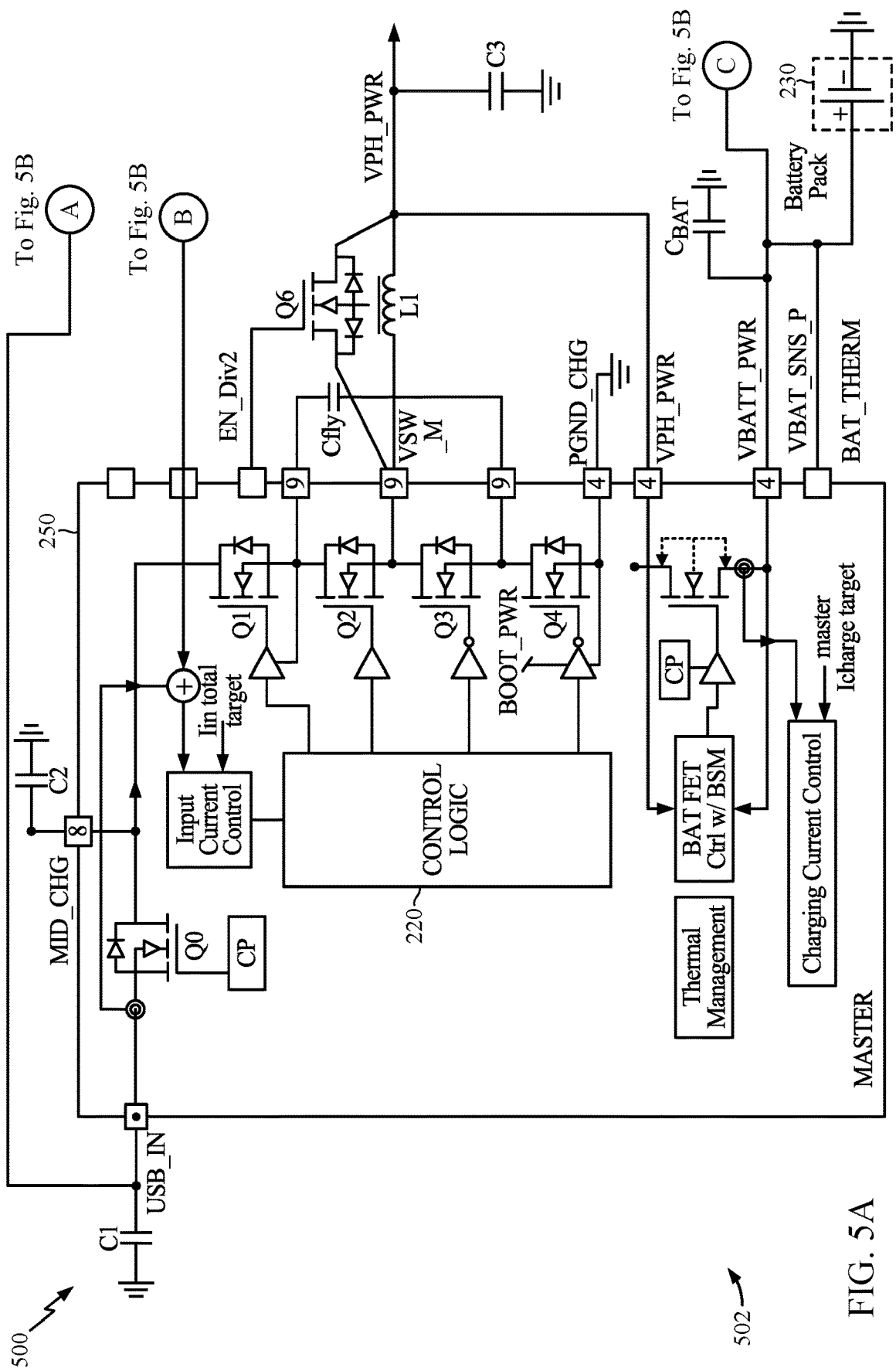
FIG. 5 is a block diagram of an example parallel charging circuit in which both the master charging circuit and the slave charging circuit use an adaptive combination power supply circuit, in accordance with certain aspects of the present disclosure. Although the block diagram of FIG. 5 is divided across multiple sheets labeled FIG. 5A and FIG. 5B, this block diagram will hereinafter be referred to as FIG. 5. The reader is to understand that portions of this block diagram may appear in FIG. 5A, FIG. 5B, or both.
Figure 5B:
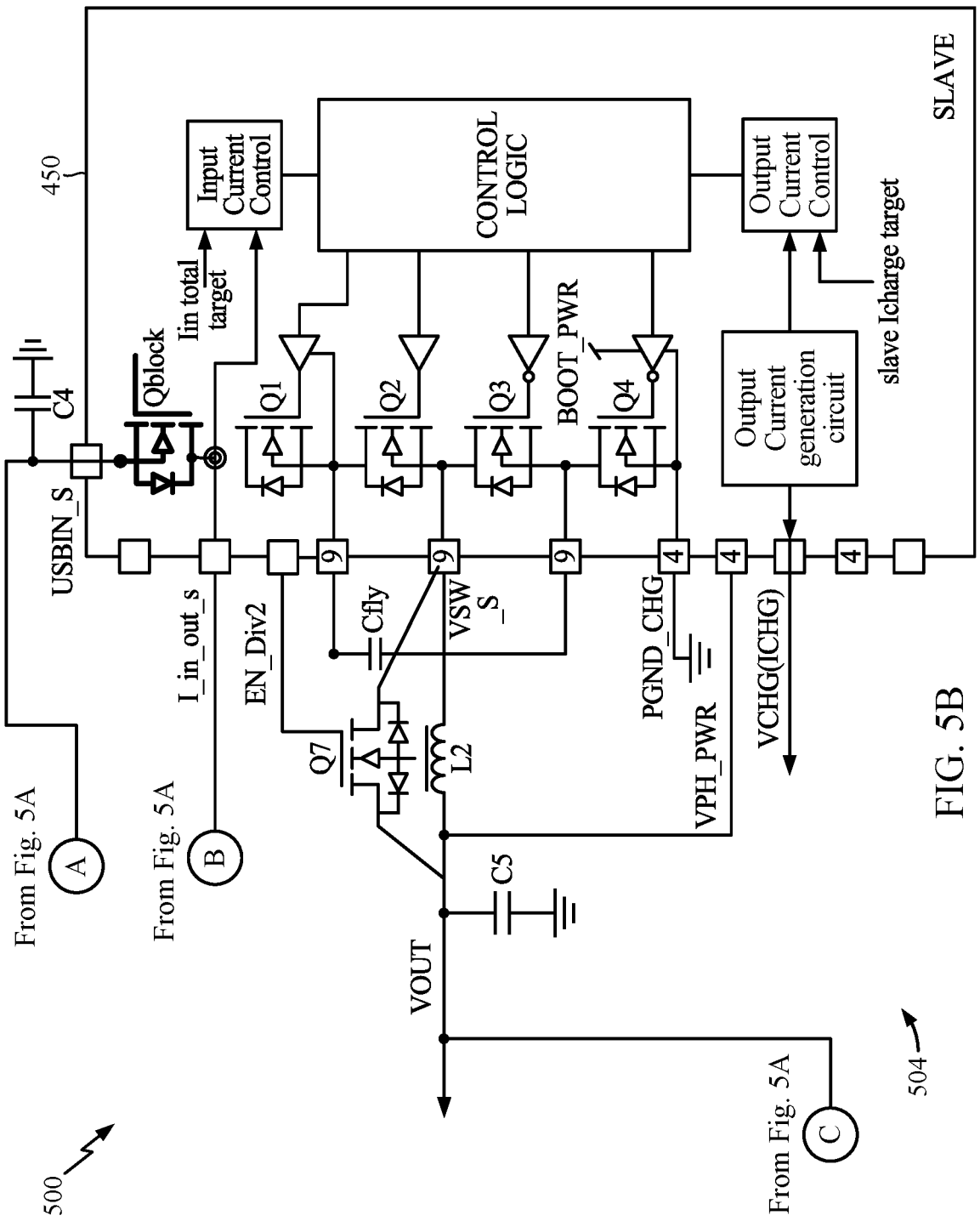

The combination 3-level buck/Div2 switching charger provides for flexible parallel charging configurations to support different applications and design specifications. For example, FIG. 5 is a block diagram of an example parallel charging circuit 500, in accordance with certain aspects of the present disclosure. The parallel charging circuit 500 includes a master charging circuit 502 (e.g., power supply circuit 200 of FIG. 2) and a slave charging circuit 504 (e.g., power supply circuit 400 of FIG. 4), in which both the master and slave charging circuits are implemented with an adaptive combination power supply circuit, as described above. While a single slave charging circuit 504 is illustrated in FIG. 5, more than one slave charging circuit (e.g., two slave charging circuits) may be utilized to charge the battery in other parallel charging solutions. One or more of these multiple slave charging circuits may be implemented with adaptive combination power supply circuits, as described herein. Other of the multiple slave charging circuits may be implemented with a traditional topology, such as a 3-level or 2-level buck converter. Furthermore, although the output voltage node (labeled "VOUT") of the slave charging circuit 504 is illustrated in FIG. 5 as being connected to the battery pack and to the VBATT_PWR node of the master charging circuit 502, the VOUT node of the slave charging circuit may be connected to the VPH_PWR node of the master charging circuit for other aspects.

With the parallel charging solution being implemented with multiple adaptive combination power supply circuits, a single software point-of reference may be used to support different configurations (e.g., various input/output options), via the control logic. Moreover, the selection between different power supply circuits is significantly simplified, with the number of options reduced.

When the input voltage (VIN, which may be USB_IN) to the power supply circuit is equal to about 12 V or 9 V, for example, the adaptive combination converter architecture can improve the efficiency by about 2-3% at loads higher than 2 A, which may represent 200 mW to 400 mW less power loss compared to conventional approaches.

The adaptive combination charger may automatically switch to Div2 mode, for example, when one or more conditions are met. When operating in Div2 mode, the adaptive combination power supply circuit will have even less power loss and higher efficiency. For certain aspects, the peak efficiency of the adaptive combination circuit operating in Div2 mode with a 4 A load is about 97%, for example.

An Example Device with an Adaptive Combination Converter

It should be understood that aspects of the present disclosure may be used in a variety of applications. Although the present disclosure is not limited in this respect, the circuits disclosed herein may be used in many apparatuses, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

Figure 6:
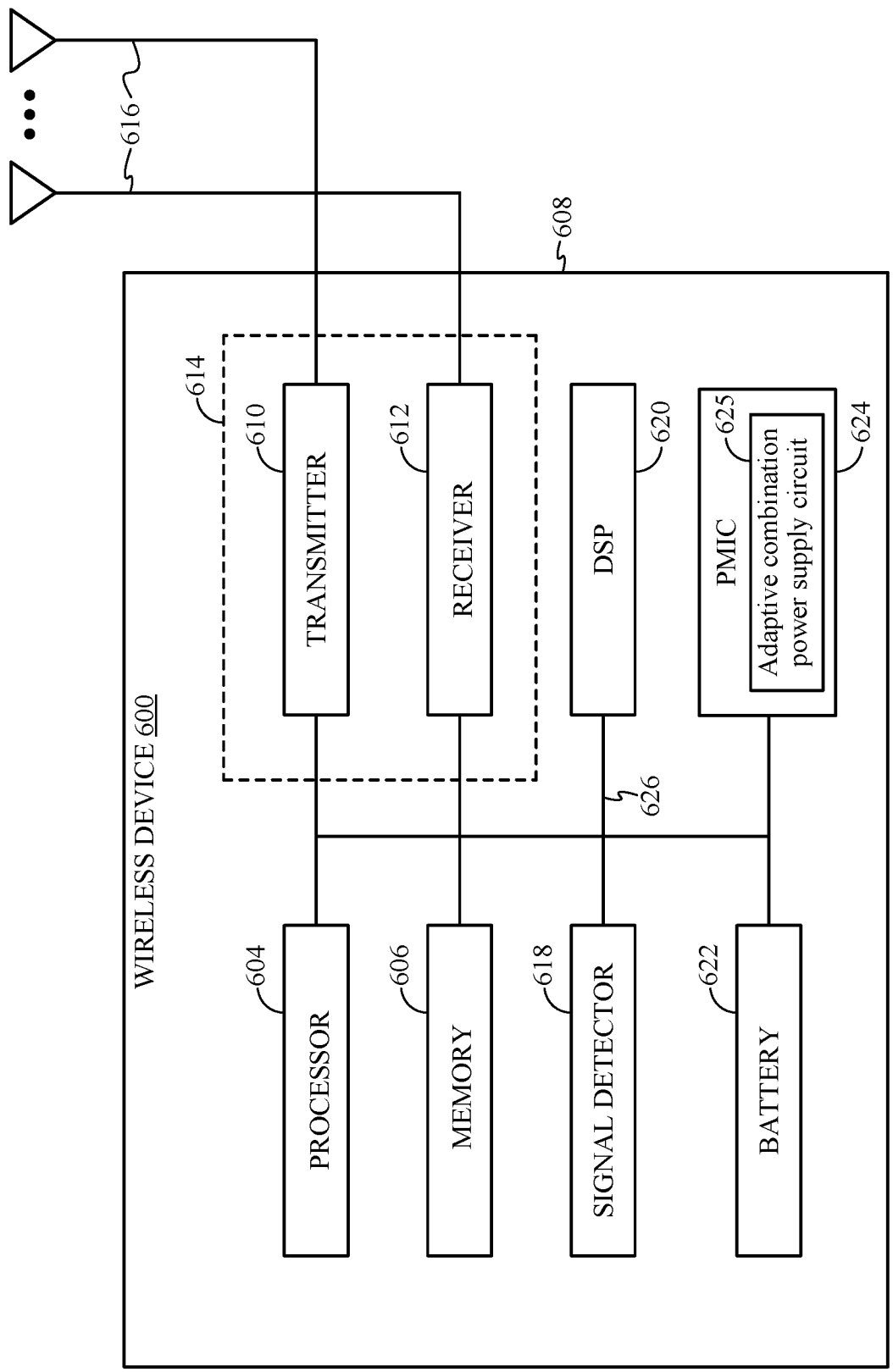
FIG. 6 is a block diagram of an example device comprising a power management integrated circuit (PMIC) that includes an adaptive combination power supply circuit, in accordance with certain aspects of the present disclosure.

FIG. 6 illustrates an example device 600 in which aspects of the present disclosure may be implemented. The device 600 may be a battery-operated device such as a cellular phone, a PDA, a handheld device, a wireless device, a laptop computer, a tablet, a smartphone, a wearable device, etc.

The device 600 may include a processor 604 that controls operation of the device 600. The processor 604 may also be referred to as a central processing unit (CPU). Memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606.

In certain aspects, the device 600 may also include a housing 608 that may include a transmitter 610 and a receiver 612 to allow transmission and reception of data between the device 600 and a remote location. For certain aspects, the transmitter 610 and receiver 612 may be combined into a transceiver 614. One or more antennas 616 may be attached or otherwise coupled to the housing 608 and electrically connected to the transceiver 614. The device 600 may also include (not shown) multiple transmitters, multiple receivers, and/or multiple transceivers.

The device 600 may also include a signal detector 618 that may be used in an effort to detect and quantify the level of signals received by the transceiver 614. The signal detector 618 may detect such signal parameters as total energy, energy per subcarrier per symbol, and power spectral density, among others. The device 600 may also include a digital signal processor (DSP) 620 for use in processing signals.

The device 600 may further include a battery 622 used to power the various components of the device 600. The device 600 may also include a power management integrated circuit (power management IC or PMIC) 624 for managing the power from the battery to the various components of the device 600. The PMIC 624 may perform a variety of functions for the device such as DC-to-DC conversion, battery charging, power-source selection, voltage scaling, power sequencing, etc. In certain aspects, the PMIC 624 may include at least a portion of an adaptive combination power supply circuit 625. The adaptive combination power supply circuit 625 may be implemented by any adaptive combination power supply circuit as described herein, such as by the adaptive combination power supply circuit 200 of FIG. 2. The various components of the device 600 may be coupled together by a bus system 626, which may include a power bus, a control signal bus, and/or a status signal bus in addition to a data bus.

Example Operations for Power Regulation

Figure 7:
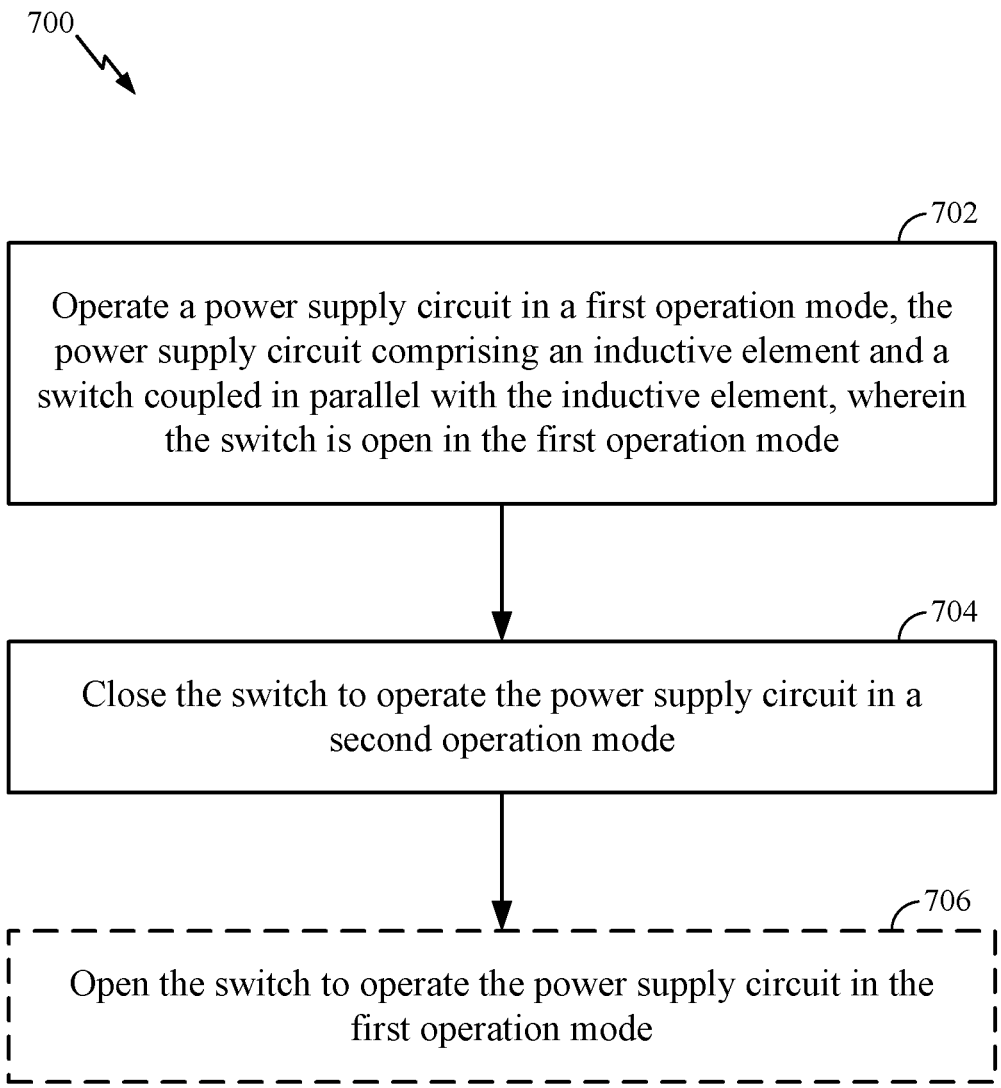
FIG. 7 is a flow diagram of example operations for regulating power, in accordance with certain aspects of the present disclosure.

FIG. 7 is a flow diagram of example operations 700 for regulating power, in accordance with certain aspects of the present disclosure. The operations 700 may be performed by an adaptive combination power supply circuit, such as the power supply circuits 200 or 400.

The operations 700 may begin, at block 702, with the power supply circuit operating in a first operation mode (e.g., a three-level buck converter mode). The power supply circuit generally includes an inductive element (e.g., inductive element L1) and a switch (e.g., switch 201) coupled in parallel with the inductive element. The switch may be open in the first operation mode. At block 704, the switch may be closed to operate the power supply circuit in a second operation mode (e.g., a divide-by-two charge pump mode).

According to certain aspects, the power supply circuit further includes a first transistor (e.g., transistor Q1); a second transistor (e.g., transistor Q2) coupled to the first transistor via a first node (e.g., first node 202); a third transistor (e.g., transistor Q3) coupled to the second transistor via a second node (e.g., second node 204); a fourth transistor (e.g., transistor Q4) coupled to the third transistor via a third node (e.g., third node 206); and a capacitive element (e.g., capacitive element Cfly) having a first terminal (e.g., terminal 208) coupled to the first node and a second terminal (e.g., terminal 210) coupled to the third node. In this case, the inductive element may have a first terminal (e.g., terminal 212) coupled to the second node; the switch may have a first terminal (e.g., terminal 216) coupled to the first terminal of the inductive element; and the switch may have a second terminal (e.g., terminal 218) coupled to a second terminal (e.g., terminal 214) of the inductive element.

According to certain aspects, the operations 700 may optionally further entail opening the switch to operate the power supply circuit in the first operation mode at block 706.

According to certain aspects, closing the switch at block 702 (or opening the switch) involves automatically closing (or opening) the switch based on at least one of an input voltage, a type of adaptor coupled to the power supply circuit and providing the input voltage, or a charging status of a load (e.g., the battery 230) of the power supply circuit.

According to certain aspects, operating the power supply circuit in at least one of the first operation mode at block 702 or the second operation mode at block 704 involves: in a first phase, activating the first transistor and the third transistor and deactivating the second transistor and the fourth transistor; in a second phase, activating the third transistor and the fourth transistor and deactivating the first transistor and the second transistor; in a third phase, activating the second transistor and the fourth transistor and deactivating the first transistor and the third transistor; and in a fourth phase, activating the third transistor and the fourth transistor and deactivating the first transistor and the second transistor. For certain aspects, the second phase follows the first phase, the third phase follows the second phase, the fourth phase follows the third phase, and the first phase follows the fourth phase during the operating. For other aspects or based on particular circuit conditions, the four phases may progress in a different order.

Certain aspects of the present disclosure achieve the benefits of both a three-level buck converter and a Div2 charge pump, allowing the adaptive combination power supply circuit to switch between different modes for different scenarios, in an effort to operate in the most optimized mode. Certain aspects of the present disclosure provide a flexible architecture configuration for different customer application specifications, providing for configuration as an adaptive combination conversion circuit, a three-level buck converter only, and/or a Div2 charge pump only. Thus, any of various suitable adaptors can be supported at the highest efficiency with a single solution. Furthermore, the power supply circuit may enable the use of a smaller inductance, such as 0.47 µH and/or 0.33 µH inductor. Certain aspects of the present disclosure can support a high power consumption with a high efficiency compared to conventional power supply circuits. Furthermore, certain aspects of the present disclosure provide flexible parallel charging configurations to support different applications and specifications. In such parallel charging configurations, the master and slave chargers implemented with adaptive combination power supply circuits described herein may have a more unified design compared to conventional solutions.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit comprising:
   an input voltage node;
   a fifth transistor coupled to the input voltage node;
   a first transistor coupled to the fifth transistor;
   a second transistor coupled to the first transistor via a first node;
   a third transistor coupled to the second transistor via a second node;
   a fourth transistor coupled to the third transistor via a third node;
   a capacitive element having a first terminal coupled to the first node and a second terminal coupled to the third node;
   an inductive element having a first terminal coupled to the second node; and
   a switch having a first terminal coupled to the first terminal of the inductive element, the switch having a second terminal coupled to a second terminal of the inductive element.

2. The power supply circuit of claim 1, wherein:
   a drain of the second transistor is coupled to a source of the first transistor;
   a drain of the third transistor is coupled to a source of the second transistor; and
   a drain of the fourth transistor is coupled to a source of the third transistor, wherein the first, second, third, and fourth transistors comprises n-type metal-oxide-semiconductor (NMOS) transistors.

3. The power supply circuit of claim 1, wherein the power supply circuit is configured as a three-level buck converter when the switch is open.

4. The power supply circuit of claim 1, wherein the power supply circuit is configured as a divide-by-two charge pump when the switch is closed.

5. The power supply circuit of claim 1, further comprising logic coupled to the switch and configured to control operation of the switch automatically based on at least one of an input voltage or an operation mode, for the power supply circuit.

6. The power supply circuit of claim 1, wherein:
   the fourth transistor is coupled to a reference potential node for the power supply circuit; and
   the second terminal of the inductive element is coupled to an output voltage node for the power supply circuit.

7. A battery charging circuit comprising:
a master charging circuit; and
at least one slave charging circuit having an output coupled in parallel with an output of the master charging circuit, at least one of the master charging circuit or the slave charging circuit comprising the power supply circuit of claim 1.

8. The power supply circuit of claim 1, further comprising:
a shunt capacitor between the fifth transistor and the first transistor.

9. The power supply circuit of claim 1, further comprising:
a charge pump connected to the gate of the fifth transistor.

* * * * *